United States Patent
Nayak et al.

(10) Patent No.: US 10,140,198 B1
(45) Date of Patent: Nov. 27, 2018

(54) NETWORKED DESKTOP ENVIRONMENT

(71) Applicant: Google LLC, Mountain View, CA (US)

(72) Inventors: Priya Nayak, San Francisco, CA (US); Eric Zhang, New York, NY (US); Jason J Ganetsky, New York, NY (US); James Watts, New York, NY (US); Robert B. Rose, Boulder, CO (US); Johnny Lee, Mountain View, CA (US); Mike Sorvillo, New York, NY (US); Hubert Ming-Hwa Chao, New York, NY (US); Aruna Balakrishnan, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 648 days.

(21) Appl. No.: 13/663,959

(22) Filed: Oct. 30, 2012

(51) Int. Cl.
*G06F 11/30* (2006.01)
*H04N 21/25* (2011.01)

(52) U.S. Cl.
CPC .......... *G06F 11/30* (2013.01); *G06F 11/3006* (2013.01); *G06F 2209/482* (2013.01); *H04N 21/25* (2013.01)

(58) Field of Classification Search
CPC ................. G06F 11/30; G06F 11/3006; G06F 2209/482; G06F 9/5072; H04N 21/252; H04N 21/4788
(Continued)

(56) References Cited

U.S. PATENT DOCUMENTS

| 4,139,901 A | 2/1979 | Ganske et al. |
| 4,694,406 A | 9/1987 | Shibui et al. |

(Continued)

FOREIGN PATENT DOCUMENTS

| CN | 1194703 | 9/1998 |
| CN | 1285557 | 2/2001 |

(Continued)

OTHER PUBLICATIONS

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

(Continued)

*Primary Examiner* — Edward Kim
(74) *Attorney, Agent, or Firm* — Young Basile Hanlon & MacFarlane, P.C.

(57) ABSTRACT

A method and apparatus for a networked desktop environment is provided. Executing a networked desktop environment may include identifying a networked desktop state of the networked desktop environment, which may include a networked desktop workspace and an information element. The networked desktop state may include information indicating a multi-dimensional position of a representation of the information element in the networked desktop workspace. Executing the networked desktop environment may include generating instructions for use in rendering the networked desktop workspace, which may include information indicative of the networked desktop state, and transmitting the instructions to an interface device. Information indicating an interaction with the networked desktop environment may be received and the networked desktop state may be updated based on the interaction information.

17 Claims, 4 Drawing Sheets

(58) Field of Classification Search
USPC ........ 709/201, 202, 204, 205, 217, 224, 206
See application file for complete search history.

(56) References Cited

U.S. PATENT DOCUMENTS

| | | | |
|---|---|---|---|
| 4,853,878 A | 8/1989 | Brown | |
| 5,038,138 A | 8/1991 | Akiyama et al. | |
| 5,175,813 A | 12/1992 | Golding et al. | |
| 5,317,306 A | 5/1994 | Abraham et al. | |
| 5,361,361 A | 11/1994 | Hickman et al. | |
| 5,394,523 A | 2/1995 | Harris | |
| 5,398,310 A | 3/1995 | Tchao et al. | |
| 5,506,951 A | 4/1996 | Ishikawa | |
| 5,526,480 A | 6/1996 | Gibson | |
| 5,563,996 A | 10/1996 | Tchao | |
| 5,610,828 A | 3/1997 | Kodosky et al. | |
| 5,623,613 A | 4/1997 | Rowe et al. | |
| 5,682,511 A | 10/1997 | Sposato et al. | |
| 5,732,399 A | 3/1998 | Katiyar et al. | |
| 5,737,553 A | 4/1998 | Bartok | |
| 5,812,123 A | 9/1998 | Rowe et al. | |
| 5,870,770 A | 2/1999 | Wolfe | |
| 5,894,311 A | 4/1999 | Jackson | |
| 5,903,267 A | 5/1999 | Fisher | |
| 5,905,863 A | 5/1999 | Knowles et al. | |
| 5,918,223 A | 6/1999 | Blum et al. | |
| 5,918,233 A | 6/1999 | La Chance et al. | |
| 5,948,058 A | 9/1999 | Kudoh et al. | |
| 5,999,159 A | 12/1999 | Isomura | |
| 5,999,179 A | 12/1999 | Kekic et al. | |
| 6,008,803 A | 12/1999 | Rowe et al. | |
| 6,026,388 A | 2/2000 | Liddy et al. | |
| 6,034,688 A | 3/2000 | Greenwood et al. | |
| 6,052,121 A | 4/2000 | Webster et al. | |
| 6,054,985 A | 4/2000 | Morgan et al. | |
| 6,078,306 A | 6/2000 | Lewis | |
| 6,088,696 A | 7/2000 | Moon et al. | |
| 6,154,740 A | 11/2000 | Shah | |
| 6,184,881 B1 | 2/2001 | Medl | |
| 6,204,847 B1 | 3/2001 | Wright | |
| 6,252,597 B1 | 6/2001 | Lokuge | |
| 6,272,537 B1 | 8/2001 | Kekic et al. | |
| 6,289,361 B1 | 9/2001 | Uchida | |
| 6,300,967 B1 | 10/2001 | Wagner et al. | |
| 6,314,424 B1 | 11/2001 | Kaczmarski et al. | |
| 6,340,979 B1 | 1/2002 | Beaton et al. | |
| 6,348,935 B1 | 2/2002 | Malacinski et al. | |
| 6,380,947 B1 | 4/2002 | Stead | |
| 6,388,682 B1 | 5/2002 | Kurtzberg et al. | |
| 6,396,513 B1 | 5/2002 | Helfman et al. | |
| 6,424,995 B1 | 7/2002 | Shuman | |
| 6,442,440 B1 | 8/2002 | Miller | |
| 6,499,026 B1 | 12/2002 | Rivette et al. | |
| 6,529,744 B1 | 3/2003 | Birkler et al. | |
| 6,549,218 B1 | 4/2003 | Gershony et al. | |
| 6,563,518 B1 | 5/2003 | Gipalo | |
| 6,567,848 B1 | 5/2003 | Kusuda et al. | |
| 6,582,474 B2 | 6/2003 | LaMarca et al. | |
| 6,628,996 B1 | 9/2003 | Sezaki et al. | |
| 6,631,398 B1 | 10/2003 | Klein | |
| 6,700,591 B1 | 3/2004 | Sharpe | |
| 6,701,346 B1 | 3/2004 | Klein | |
| 6,738,787 B2 | 5/2004 | Stead | |
| 6,756,997 B1 | 6/2004 | Ward, III et al. | |
| 6,782,393 B1 | 8/2004 | Balabanovic et al. | |
| 6,842,653 B2 | 1/2005 | Weishut et al. | |
| 6,889,223 B2 | 5/2005 | Hattori et al. | |
| 7,028,263 B2 | 4/2006 | Maguire | |
| 7,085,755 B2 | 8/2006 | Bluhm et al. | |
| 7,107,268 B1 | 9/2006 | Zawadzki et al. | |
| 7,117,445 B2 | 10/2006 | Berger | |
| 7,120,646 B2 | 10/2006 | Streepy, Jr. | |
| 7,127,476 B2 | 10/2006 | Narahara | |
| 7,137,074 B1 | 11/2006 | Newton et al. | |
| 7,139,800 B2 | 11/2006 | Bellotti et al. | |
| 7,185,054 B1 * | 2/2007 | Ludwig ............... | G06F 3/0482 |
| | | | 348/E7.081 |
| 7,188,316 B2 | 3/2007 | Gusmorino et al. | |
| 7,209,246 B2 | 4/2007 | Suda et al. | |
| 7,243,125 B2 | 7/2007 | Newman et al. | |
| 7,320,105 B1 | 1/2008 | Sinyak et al. | |
| 7,360,175 B2 | 4/2008 | Gardner et al. | |
| 7,412,660 B2 | 8/2008 | Donalson | |
| 7,415,666 B2 | 8/2008 | Sellers et al. | |
| 7,421,664 B2 | 9/2008 | Wattenberg et al. | |
| 7,421,690 B2 | 9/2008 | Forstall et al. | |
| 7,454,716 B2 | 11/2008 | Venolia | |
| 7,458,019 B2 | 11/2008 | Gumz et al. | |
| 7,487,458 B2 | 2/2009 | Jalon et al. | |
| 7,496,829 B2 | 2/2009 | Rubin et al. | |
| 7,505,974 B2 | 3/2009 | Gropper | |
| 7,512,901 B2 | 3/2009 | Vong et al. | |
| 7,523,126 B2 | 4/2009 | Rivette et al. | |
| 7,797,274 B2 | 9/2010 | Strathearn et al. | |
| 7,836,391 B2 | 11/2010 | Tong | |
| 7,844,906 B2 | 11/2010 | Berger | |
| 7,908,566 B2 | 3/2011 | Wilcox et al. | |
| 7,917,867 B2 | 3/2011 | Wattenberg et al. | |
| 7,987,491 B2 | 7/2011 | Reisman | |
| 8,028,250 B2 | 9/2011 | Vronay et al. | |
| 8,065,691 B2 | 11/2011 | Pendse et al. | |
| 8,141,090 B1 * | 3/2012 | Graupner ............. | G06F 9/45558 |
| | | | 709/225 |
| 8,199,899 B2 | 6/2012 | Rogers et al. | |
| 8,281,247 B2 | 10/2012 | Daniell et al. | |
| 8,508,532 B1 | 8/2013 | Logan et al. | |
| 8,584,022 B1 | 11/2013 | O'Shaughnessy et al. | |
| 2002/0004793 A1 | 1/2002 | Keith, Jr. | |
| 2002/0019827 A1 | 2/2002 | Shiman et al. | |
| 2002/0051015 A1 | 5/2002 | Matoba | |
| 2002/0073112 A1 | 6/2002 | Kariya | |
| 2002/0073157 A1 | 6/2002 | Newman et al. | |
| 2002/0080187 A1 | 6/2002 | Lawton | |
| 2002/0084991 A1 | 7/2002 | Harrison et al. | |
| 2002/0099775 A1 | 7/2002 | Gupta et al. | |
| 2002/0120633 A1 | 8/2002 | Stead | |
| 2002/0120858 A1 | 8/2002 | Porter et al. | |
| 2002/0128047 A1 | 9/2002 | Gates | |
| 2002/0138834 A1 | 9/2002 | Gerba et al. | |
| 2002/0174183 A1 | 11/2002 | Saeidi | |
| 2002/0186252 A1 | 12/2002 | Himmel et al. | |
| 2002/0194280 A1 | 12/2002 | Altavilla et al. | |
| 2003/0014482 A1 | 1/2003 | Toyota et al. | |
| 2003/0056899 A1 | 3/2003 | Hanazaki | |
| 2003/0101065 A1 | 5/2003 | Rohall et al. | |
| 2003/0146941 A1 | 8/2003 | Bailey et al. | |
| 2003/0151621 A1 | 8/2003 | McEvilly et al. | |
| 2003/0154212 A1 | 8/2003 | Schirmer et al. | |
| 2003/0163537 A1 | 8/2003 | Rohall et al. | |
| 2003/0167310 A1 | 9/2003 | Moody et al. | |
| 2003/0218637 A1 | 11/2003 | Sloo et al. | |
| 2003/0226152 A1 | 12/2003 | Billmaier et al. | |
| 2004/0046776 A1 | 3/2004 | Phillips et al. | |
| 2004/0068544 A1 | 4/2004 | Malik et al. | |
| 2004/0073616 A1 | 4/2004 | Fellenstein et al. | |
| 2004/0181577 A1 * | 9/2004 | Skurikhin ............. | G06Q 10/10 |
| | | | 709/204 |
| 2004/0181579 A1 * | 9/2004 | Huck .................... | G06Q 10/10 |
| | | | 709/205 |
| 2004/0236830 A1 * | 11/2004 | Nelson ............... | H04L 29/06027 |
| | | | 709/204 |
| 2004/0237049 A1 | 11/2004 | Pletcher et al. | |
| 2004/0243926 A1 | 12/2004 | Trenbeath et al. | |
| 2004/0260756 A1 | 12/2004 | Forstall et al. | |
| 2004/0268265 A1 | 12/2004 | Berger | |
| 2005/0004989 A1 | 1/2005 | Satterfield et al. | |
| 2005/0039142 A1 | 2/2005 | Jalon et al. | |
| 2005/0108345 A1 | 5/2005 | Suzuki | |
| 2005/0108351 A1 | 5/2005 | Naick et al. | |
| 2005/0120361 A1 | 6/2005 | Bailey et al. | |
| 2005/0132014 A1 * | 6/2005 | Horvitz ................ | G06Q 30/02 |
| | | | 709/206 |
| 2005/0144569 A1 | 6/2005 | Wilcox et al. | |
| 2005/0144571 A1 | 6/2005 | Loverin et al. | |

(56) References Cited

U.S. PATENT DOCUMENTS

| | | | |
|---|---|---|---|
| 2005/0144572 A1 | 6/2005 | Wattenberg et al. | |
| 2005/0185920 A1 | 8/2005 | Harper et al. | |
| 2005/0229102 A1 | 10/2005 | Watson et al. | |
| 2005/0251748 A1 | 11/2005 | Gusmorino et al. | |
| 2006/0117340 A1 | 6/2006 | Pavlovskaia et al. | |
| 2006/0170763 A1* | 8/2006 | Kawamura | H04N 7/147 348/14.09 |
| 2006/0271381 A1 | 11/2006 | Pui | |
| 2006/0287058 A1* | 12/2006 | Resnick | G07F 17/3211 463/19 |
| 2008/0046510 A1* | 2/2008 | Beauchamp | G06Q 10/107 709/204 |
| 2008/0114838 A1 | 5/2008 | Taylor | |
| 2008/0155075 A1* | 6/2008 | Cromer | G06F 9/4416 709/222 |
| 2008/0238922 A1 | 10/2008 | Rhodes et al. | |
| 2008/0270935 A1 | 10/2008 | Wattenberg et al. | |
| 2008/0307343 A1 | 12/2008 | Robert et al. | |
| 2009/0125838 A1* | 5/2009 | Bhogal | H04L 47/29 715/788 |
| 2009/0147297 A1 | 6/2009 | Stevenson | |
| 2009/0172082 A1* | 7/2009 | Sufuentes | G06F 21/128 709/203 |
| 2009/0222741 A1* | 9/2009 | Shaw | G06Q 10/109 715/753 |
| 2009/0265334 A1 | 10/2009 | Narayanan et al. | |
| 2010/0083179 A1 | 4/2010 | Decker et al. | |
| 2010/0299630 A1 | 11/2010 | McCutchen et al. | |
| 2010/0304858 A1 | 12/2010 | Asuke et al. | |
| 2010/0325589 A1 | 12/2010 | Ofek et al. | |
| 2011/0048266 A1 | 3/2011 | Crystal et al. | |
| 2011/0099510 A1 | 4/2011 | Wilcox et al. | |
| 2011/0184993 A1* | 7/2011 | Chawla | G06F 9/45533 707/802 |
| 2011/0231280 A1* | 9/2011 | Farah | G06Q 10/10 705/26.8 |
| 2011/0239134 A1* | 9/2011 | Spataro | G06F 17/30011 715/753 |
| 2011/0276620 A1* | 11/2011 | Pirzada | G06F 3/061 709/203 |
| 2011/0320799 A1* | 12/2011 | Lam | G06F 8/63 713/2 |
| 2012/0072898 A1* | 3/2012 | Pappas | G06F 21/10 717/171 |
| 2012/0096461 A1* | 4/2012 | Goswami | G06F 9/45558 718/1 |
| 2012/0110443 A1* | 5/2012 | Lemonik | G06F 17/2288 715/255 |
| 2012/0151372 A1* | 6/2012 | Kominac | G06F 17/30905 715/740 |
| 2013/0014023 A1* | 1/2013 | Lee | G06Q 10/103 715/751 |
| 2014/0046956 A1* | 2/2014 | Zenger | G06F 17/30445 707/748 |
| 2014/0237357 A1 | 8/2014 | Meyer et al. | |

FOREIGN PATENT DOCUMENTS

| | | |
|---|---|---|
| EP | 1077417 | 2/2001 |
| EP | 1232434 | 8/2002 |
| JP | 408286871 | 11/1996 |
| JP | 09326822 | 12/1997 |
| JP | 2001325296 | 11/2001 |
| JP | 2003271526 | 9/2003 |
| WO | WO9724684 | 7/1997 |
| WO | WO9744748 | 11/1997 |
| WO | WO0123995 | 4/2001 |

OTHER PUBLICATIONS

ISR and Written Opinion in related matter. dated Apr. 11, 2014; PCT/US2014/017297 filed Feb. 20, 2014.

Mozilla, "Introduction to Video Coding Part 1: Transform Coding", Video Compression Overview, Mar. 2012, 171 pp.

Rohall, Steven L., et al., "Email Visualizations to Aid Communications", IEEE Symposium on Information Visualization, Oct. 22-23, 2001, 5 pages.

Series H: Audiovisual and Multimedia Systems; Infrastructure of audiovisual services—Coding of moving video; Advanced video coding for generic audiovisual services. H.264. Version 1. International Telecommunication Union. Dated May, 2003.

Venolia, Gina, et al., "Understanding Sequence and Reply Relationship within Email Converstations: A Mixed-Model Visualization", Paper: Intergrating Tools and Tasks, vol. No. 5, Issue No. 1, Ft. Lauderdale, Florida, Apr. 5-10, 2003, pp. 361-368.

"Series H: Audiovisual and Multimedia Systems; Infrastructure of audiovisual services—Coding of moving video; Advanced video coding for generic audiovisual services". H.264. Version 1. International Telecommunication Union. Dated May 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Bankoski et al. "Technical Overview of VP8, an Open Source Video Codec for the Web". Dated Jul. 11, 2011.

Bankoski, J., Koleszar, J., Quillio, L., Salonen, J., Wilkins, P., and Y. Xu, "VP8 Data Format and Decoding Guide", RFC 6386, Nov. 2011.

\* cited by examiner

NETWORKED DESKTOP ENVIRONMENT

TECHNICAL FIELD

This application relates to computer desktop environments.

BACKGROUND

A desktop environment may be executed on a computing device and may provide an interface to allow access to and organization of electronic information stored on, or accessed by, the computing device. Accordingly, it would be advantageous to provide a method and apparatus for a networked desktop environment.

SUMMARY

Disclosed herein are aspects of systems, methods, and apparatuses for a networked desktop environment.

An aspect is a method that may include identifying, by a processor in response to instructions stored on a non-transitory storage medium, a networked desktop state of a networked desktop environment wherein the networked desktop environment includes a networked desktop workspace and an information element, and wherein the networked desktop state includes information indicating a multi-dimensional position of a representation of the information element in the networked desktop workspace; generating instructions for use in rendering the networked desktop workspace, wherein the instructions include information indicative of the networked desktop state; transmitting the instructions to an interface device; receiving information indicating an interaction with the networked desktop environment wherein the interaction includes a change of the multi-dimensional position; and storing the networked desktop environment, wherein storing the networked desktop environment includes updating the networked desktop state based on the change of the multi-dimensional position.

Another aspect is an apparatus for use in a networked desktop environment. The apparatus includes a memory and at least one processor configured to execute instructions stored in the memory to identify a state of a networked desktop environment wherein the networked desktop environment includes a networked desktop workspace and an information element, and wherein the state includes information indicating a multi-dimensional position of a representation of the information element in the networked desktop workspace; generate instructions for use in rendering the networked desktop workspace, wherein the instructions include information indicative of the state; transmit the instructions to an interface device; receive information indicating an interaction with the networked desktop environment wherein the interaction includes a change of the multi-dimensional position; and store the networked desktop environment, wherein storing the networked desktop environment includes updating the state based on the change of the multi-dimensional position.

An aspect is a method that may include receiving, from a networked device, instructions for use in rendering a networked desktop workspace of a networked desktop environment, wherein the networked desktop workspace includes an information element and wherein the instructions indicate a state of the networked desktop environment, wherein the state includes information indicating a position of a representation of the information element within the networked desktop workspace; outputting a rendering of the networked desktop workspace to a display device of an interface device; receiving an indication of an interaction with the networked desktop environment from an input device of the interface device via an operating system of the interface device; and transmitting information indicating the interaction with the networked desktop environment to the networked device.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

A computer implemented application, such as a productivity application, a file system application, or music library management application, may include limited information organization and display capabilities. Information may be stored in files, which may be organized in folders, which may be organized in a file system, which may be hierarchical. Files and folders, and information about the files and folders, may be organized for display in system defined views, such as a list view or a grid view. The system defined views may be sorted and filtered based on criteria, such as file type, creation date, or file size.

A computer implemented desktop environment application may include extensive information organization and display capabilities. For example, a computer implemented desktop environment application may allow for explicit control of information organization and display, such as spatial organization and interface customization. A computer implemented desktop environment application may be tightly coupled with a local operating system. In some implementations, a computing device may store desktop environment state information independently for each user account associated with a computing device.

Networked applications may allow for generating, processing, and storing electronic information at a network location, may reduce the difficulties encountered with sharing locally generated, processed, and stored information, and may allow for improved ease of collaboration. Networked applications may be accessible by various computing devices using various interface applications, such as a web browser or a native application.

A networked desktop environment may include a networked desktop workspace and a networked desktop state, which may be generated, processed, or stored at a network location and may include extensive information organization and display information. A networked desktop environment may be operating system and device independent, and may be accessible by various computing devices using various interface applications, such as a web browser or a native application. The networked desktop state may include information such as information indicating a state of one or more applications associated with the networked desktop environment. A networked desktop environment may be sharable and may be accessible concurrently by multiple computing devices.

Figure 1:
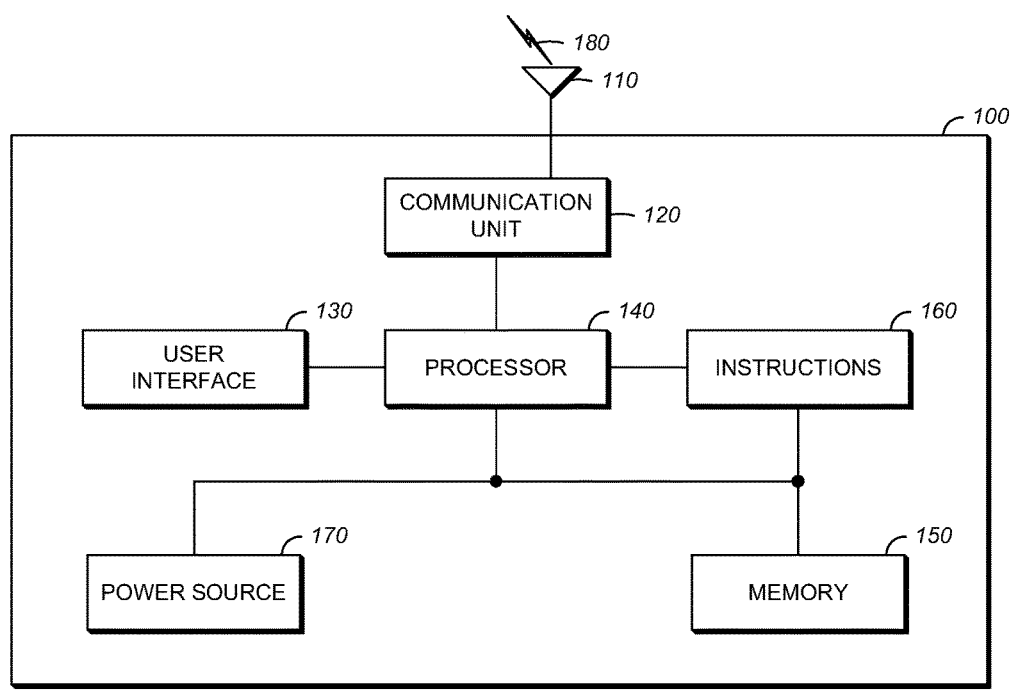
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
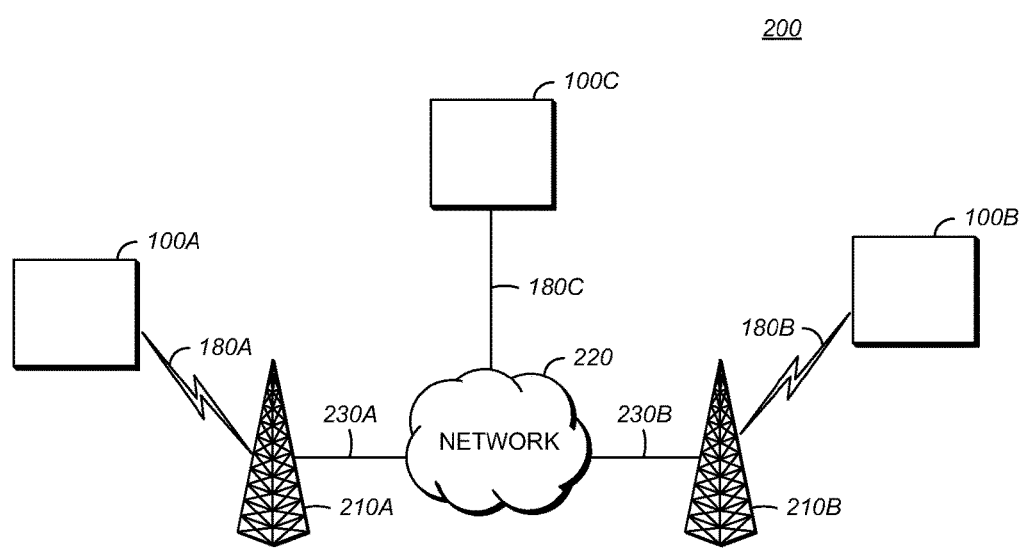
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
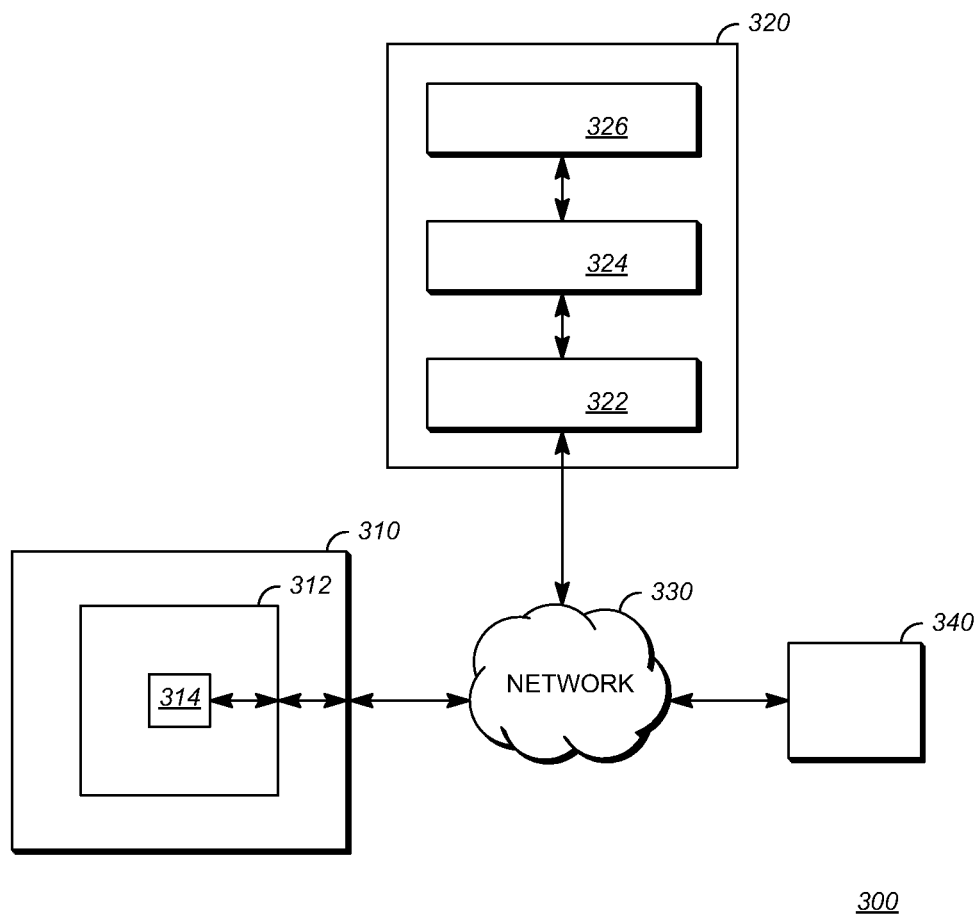
FIG. 3 is a diagram of a communication system for a networked application in accordance with implementations of this disclosure.

FIG. 3 is a diagram of a communication system for a networked application 300 in accordance with implementations of this disclosure. Executing the networked application 300 may include a user device 310, which may be a computing device, such as the computing device 100 shown in FIG. 1 or the computing and communication devices 100A/100B shown in FIG. 2, communicating with a server 320, which may be a computing device, such as the computing device 100 shown in FIG. 1 or computing and communication device 100C shown in FIG. 2, via a network 330, such as the network 220 shown in FIG. 2.

In some implementations, the server 320 may execute a portion or portions of the networked application 300, which may include, for example, generating, modifying, and storing documents and information related to the documents, such as metadata, and providing information for displaying and interacting with the networked application 300 to the user device 310. In some implementations, the server 320 may include one or more logical units 322/324/326. For example, the server 320 may include a web server 322 for receiving and processing requests, such as HTTP requests, from user devices; an application server 324 for executing applications, such as a spreadsheet application or a word processing application; and a database 326 for storing and managing data, such as documents or information about documents, such as metadata. In some implementations, the server 320 may provide information for the networked application 300 to the user device 310 using one or more protocols, such as Hypertext Markup Language (HTML), Cascading Style Sheets (CSS), Extensible Markup Language (XML), or JavaScript Object Notation (JSON).

The user device 310 may execute a portion or portions of the networked application 300. For example, the user device 310 may execute a local application 312, such as a browser application, which may receive information from the server 320 and may present a representation of an interface 314 for displaying the networked application 300 and user interactions therewith. For example, the user device 310, may execute a browser application, the browser application may send a request, such as an HTTP request, for the networked application 300 to the server 320, the browser may receive information for presenting the networked application 300, such as HTML and XML data, and the browser may present an interface for the networked application 300. The user device 310 may execute portions of the networked application 300, which may include executable instructions, such as JavaScript, received from the server 320. The user device 310 may receive user input for the networked application 300, may update the interface 314 for the networked application 300 in response to the user input, and may send information for the networked application 300, such as information indicating the user input, to the server 320.

In some implementations, a portion or portions of the networked application may be cached at the user device 310. For example, the user device 310 may execute a portion or portions of the networked application 300 using information previously received from the server 320 and stored on the user device 310. Although the user device 310 and the server 320 are shown separately, they may be combined. For example, a physical device, such as the computing device 100 shown in FIG. 1 may execute the user device 310 as a first logical device and may execute the server 320 as a second logical device.

In some implementations, the networked application 300 may generate files, folders, or documents, such as spreadsheets or word processing documents. The files, folders, or documents, may be created and stored on the user device 310, the server 320, or both. For example, a document may be created and stored on the server 320 and a copy of the document may be transmitted to the user device 310. Modifications to the document may be made on the user device 310 and transmitted to the server 320. In another example, a document may be created and stored on the user device 310 and the document, or modifications to the document, may be transmitted to the server 320.

In some implementations, a networked application, or an element thereof, may be accessed by multiple user devices. For example, the networked application 300 may be executed by a first user device 310 in communication with the server 32, and a document may be stored at the server 320. The networked application 300 may be executed by a second user device 340, which may be a computing device, such as the computing device 100 shown in FIG. 1 or the computing and communication devices 100A/100B shown in FIG. 2, a user may input modifications to the document at the second user device 340, and the modifications may be saved to the server 320.

In some implementations, a networked application, or an element thereof, may be collaboratively accessed by multiple user devices. For example, a first user device 310 may execute a first instance of the networked application 300 in communication with the server 320, and a document may be stored at the server 320. The first user device 310 may continue to display or edit the document. The second user device 340 may concurrently, or substantially concurrently, execute a second instance of the networked application 300, and may display or edit the document. User interactions with the document at one user device may be propagated to collaborating user devices. For example, one or both of the user devices 310/340 may transmit information indicating user interactions with the document to the server 320, and the server may transmit the information, or similar information, to the other user device 310/340. Although FIG. 3 shows two user devices, any number of user devices may collaborate. User interactions with the networked application 300 at one user device may be propagated to collaborating user devices in real-time, or near real-time. Some user interactions with the networked application 300 may not be transmitted to the server 320 and may not be propagated to the collaborating user devices.

Figure 4:
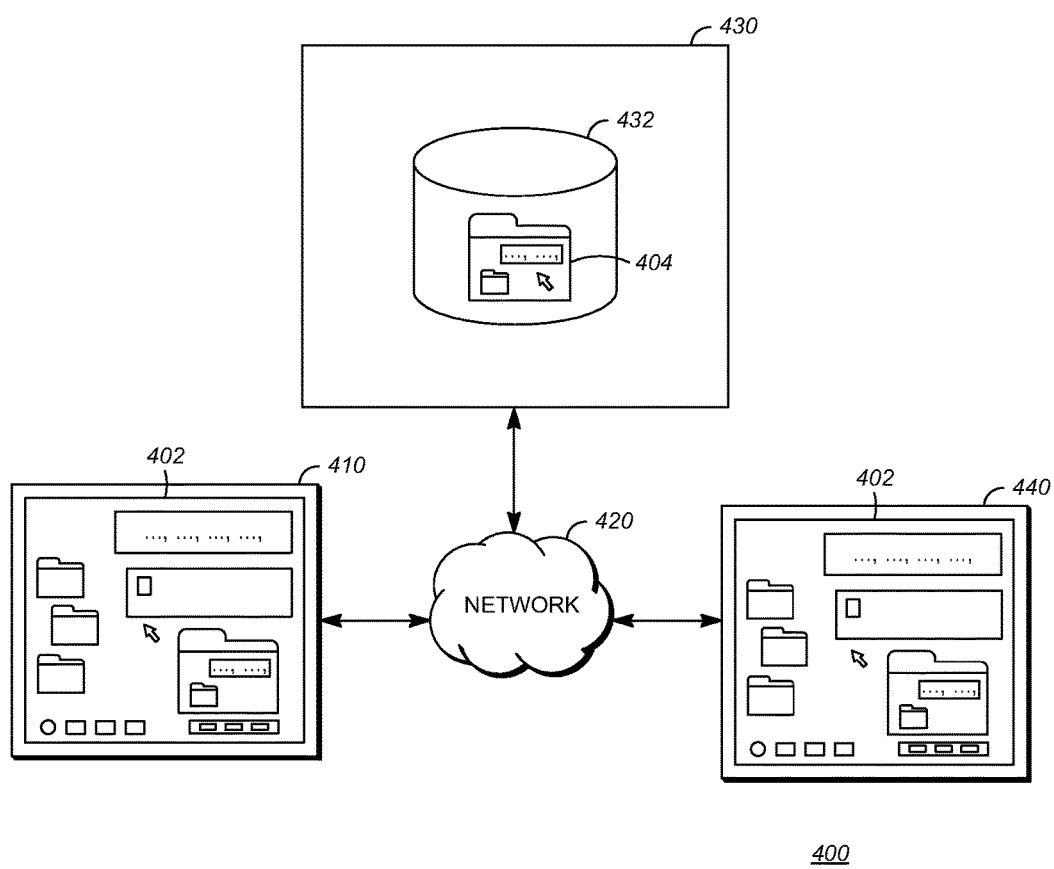
FIG. 4 is a block diagram of a networked desktop environment in accordance with implementations of this disclosure.

FIG. 4 is a block diagram of executing a networked desktop environment 400 in accordance with implementations of this disclosure. Executing the networked desktop environment 400 may include an interface device 410, which may be a computing device, such as the computing device 100 shown in FIG. 1 or the computing and communication devices 100A/100B shown in FIG. 2, communicating with a networked device 420, such as a backing server, which may be may be a computing device, such as the computing device 100 shown in FIG. 1 or computing and communication device 100C shown in FIG. 2, via a network 430, such as the network 220 shown in FIG. 2. For example, the networked desktop environment 400 may be implemented as a networked application, such as the networked application 300 shown in FIG. 3. The interface device 410 may include an input device, such as a keyboard, a mouse, or a touchpad, and an output device, such as a graphical presentation device, an audio presentation device, or a tactile presentation device. In some implementations, the interface device 410 may include a combined input/output device, such as a touch screen device.

A networked desktop environment 400 may include a networked desktop workspace 402 and a networked desktop state 404. The networked desktop workspace 402 may define a space, such as a two dimensional area, wherein information elements associated with the networked desktop environment 400, such as files, folders, widgets, tiles, applets, windows, pointers, and the like, can be organized, oriented, and customized. For example, the networked desktop workspace 402 may include an interface profile, which may include definitions for interface elements, such as a background (which may include a static or dynamic image or color), a window color, a mouse style, or a sound scheme, and the interface profile may be configurable. The networked desktop state 404 may include information indicating the state of the networked desktop environment 400, which may include a state of the networked desktop workspace 402 and a state of each respective information element within the networked desktop workspace 402. In some implementations, the networked desktop state 404 may be stored at the networked device, as shown. In some implementations, the networked desktop state 404, or a portion thereof, may be cached at the interface device 410.

Executing the networked desktop environment 400 may include creating a networked desktop environment. Creating a networked desktop environment 400 may include creating a networked desktop workspace 402 associated with the networked desktop environment 400 and creating and storing a networked desktop state 404 associated with the networked desktop environment 400. In some implementations, creating a networked desktop environment 400 may include naming the networked desktop environment 400. In some implementations, creating a networked desktop environment 400 may include creating an identifier associated with the networked desktop environment 400, such as a URI, which may include the name of the networked desktop environment 400, and the networked desktop environment 400 may be accessible using the identifier.

In some implementations, creating a networked desktop environment 400 may include generating one or more file system objects, such as files or folders. For example, creating a networked desktop environment 400 may include creating a folder associated with the networked desktop environment 400, creating a file in the folder, and storing state information for the networked desktop environment 400 in the file.

In some implementations, creating a networked desktop environment 400 may include generating and storing one or more records in a database. For example, creating a networked desktop environment 400 may include generating database records indicating the networked desktop environment 400 and the state of the networked desktop environment 400.

In some implementations, creating a networked desktop environment 400 may include creating a combination of file system objects and database records. For example, creating a networked desktop environment 400 may include creating file system objects on an interface device and generating and storing records in a database of a networked device.

In some implementations, a networked desktop environment 400 may be created using a networked application, such as an application executed in a browser or an installed application configured to create a networked desktop environment 400. In some implementations, an operating system of the interface device 410 may be configured to create a networked desktop environment 400. For example, the interface device 410 may create a networked desktop environment 400 locally and may send information indicating the networked desktop environment 400 to the networked device 430. The networked device 430, may store the networked desktop environment 400, which may include creating and storing files, folders, or database records on the networked device 430.

In some implementations, creating a networked desktop environment 400 may include adding information elements to the networked desktop environment 400. For example, creating the networked desktop environment 400 may include adding a basic set of information elements to the networked desktop environment 400. For example, the basic set of information elements may include a control, such as a start button. In some implementations, the basis set of information elements may depend on a type of the interface device 410, on a type of application used for creating the networked desktop environment 400, or may be explicitly indicated during the creation process.

In some implementations, the networked desktop environment 400 may be associated with a local desktop environment, such as an OS desktop environment. For example, a user may log in to the interface device 410, the interface device 410 may determine that a local desktop environment does not exist for the user, the interface device 410 may determine that a networked desktop environment 400 exists for the user, the interface device 410 may receive information associated with the networked desktop environment 400 from the networked device 430, and the interface device 410 may use the networked desktop environment 400 as the local desktop interface.

In some implementations, a user may create multiple networked desktop environments and may switch between active networked desktop environments. For example, a user may access multiple networked desktop environments via a control, such as a file system application control. In some implementations, a desktop environment may be accessed from another desktop environment. For example, a desktop environment may include a link to another desktop environment.

Executing the networked desktop environment 400 may include rendering the networked desktop workspace 402. In some implementations, the interface device 410 may receive instructions for use in rendering the networked desktop workspace 402 from the networked device 430 via the network 420. For example, the instructions may include information indicative of the networked desktop state 404, or a portion thereof. The interface device 410 may present, via the output device, a representation of the networked desktop workspace 402.

In some implementations, the networked desktop environment 400 may be device independent, or partially device independent. For example, the networked device 430 may generate information for rendering the networked desktop workspace 402 based on a capability of the application executing the networked desktop environment 400 at the interface device 410, a capability of the interface device 410, or a combination of capabilities. In some implementations, the networked device 430 may generate information for rendering the networked desktop workspace 402 independently of the capabilities of the interface device 410 or executing application, and the interface device 410 or executing application may render the networked desktop workspace 402 based on their respective capabilities. In some implementations, a rending mode may be explicitly indicated, based on, for example, user input. In some implementations, a rendering mode may be automatically determined based on the capabilities of the interface device, the capabilities of the executing application, an account associated with executing the networked desktop environment 400, such as logged in user account, access privileges associated with executing the networked desktop environment 400, an orientation of the interface device 410, or a geographic location of the interface device 410.

In some implementations, the interface device 410 may render the networked desktop workspace 402 without receiving information from the networked device 430. For example, the interface device 410 may create a networked desktop environment 400 and may render the networked desktop workspace 402 without receiving information from the networked device 430. In another example, the interface device 410 may cache information associated with the networked desktop environment 400, such as the networked desktop state 404, which may have been received from the networked device 430, and may render the networked desktop workspace 402 using the cached information.

In some implementations, an information element may be rendered based on a rendering mode or capability of the rendering application or interface device 410. For example, an interface device with a large output display may render a calendar information element in the networked desktop workspace using a monthly view, and an interface device with a small output display may render the calendar information element in the networked desktop workspace using a list view. In some implementations, the rendering mode may be explicitly configurable. For example, the networked desktop workspace may include a windowed design application; an interface device including a large output display may render the windowed design application, and an interface device including a small output display may render a portion of the windowed design application, such as a tool palette. The portion of the networked desktop workspace rendered on, for example, the interface device including the small output display may be explicitly adjustable. For example, a user may select a portion of the networked desktop workspace to render.

In some implementations, a networked desktop environment 400 may include an information element associated with an application that that the interface device 410 does not include and the interface device may render the information element using a default control, such as a file system control.

Executing the networked desktop environment 400 may include interacting with the networked desktop environment 400. In some implementations, the interface device 410 may receive, via, for example, an input device, such as a keyboard or a mouse, information indicating an interaction (input) with the networked desktop environment 400. The interface device 410 may render a representation of the interaction in the networked desktop workspace 402 and may transmit information indicating the interaction to the networked device 430 via the network 420. For example, the input may indicate a change in the networked desktop environment 400, such as a change in a position of a pointer in the networked desktop workspace 402. In some implementations, the interface device 410 may accumulate information indicating multiple interactions with the networked desktop workspace 402 and may transmit information indicating the accumulated interactions to the interface device 410. For example, the interface device 410 may store a local version of the networked desktop state 404, may update the local version of the networked desktop state 404 in response to the interactions, and may send information indicative of the updated networked desktop state 404 to the networked device 430.

The networked device 430 may receive information indicating the interaction with the networked desktop environment 400 from the interface device 410 via the network 420, and may update the network desktop state 404 based on the interaction. The networked device 430 may store the updated network desktop state 404. In some implementations, the networked device may store the information indicating the interaction with the networked desktop environment 400. In some implementations, updating the network desktop state 404 may be omitted. In some implementations, sequenced record of interactions with the networked desktop environment 400 may be recorded, the sequence may be searchable, and the sequence may be used to reverse or repeat interactions with the networked desktop environment 400.

In some implementations, interacting with the networked desktop environment 400 may include adding, or removing, an information element such as a file, a folder, a widget, a tile, an applet, a window, a pointer, or any other element of a desktop workspace, to the networked desktop environment 400.

Adding an information element to the networked desktop environment 400 may include creating an information element and associating the information element with the networked desktop environment 400. For example, associating an information element with the networked desktop environment 400 may include identifying an information element stored in a local file system or a networked file system, and adding an indication of the information element to the networked desktop environment 400. In some implementations, an information element may be identified using a control, such as a file picker. In some implementations, an information element may be identified based on a gesture, such as a drag and drop gesture. For example, an information element may be dragged into the networked desktop environment 400 from another application, such as a file system application.

Adding an information element to the networked desktop environment 400 may include adding state information, such as information indicating a relative position of an icon indicating the information element within the networked desktop workspace 402. In some implementations, the position information may be identified automatically by the networked desktop environment 400.

In some implementations, adding an information element to the networked desktop environment 400 may include opening an application in a window in the networked desktop environment 400. Similarly, removing an information element from the networked desktop environment 400 may include closing a windowed application.

In some implementations, an information element may be added or deleted from the networked desktop environment 400 by another application. For example, the networked desktop environment 400 may include a link to a shared information element, such as a shared document. The shared information element may be deleted in another application, or an authorization for the networked desktop environment 400 to access the shared information element may be revoked, and the shared information element may be automatically removed from the networked desktop environment 400.

In some implementations, adding an information element to the networked desktop environment 400 may include adding another networked desktop environment, or a link to another desktop environment. For example, the networked desktop environment 400 may be a part of a hierarchical file system, such as a local file system, a networked file system, or both, and adding another networked desktop environment may include creating the other networked desktop environment and adding a link to the other networked desktop environment to the networked desktop workspace 402.

In some implementations, interacting with the networked desktop environment 400 may include opening another networked desktop environment. For example, the networked desktop environment 400 may include another networked desktop environment and the other networked desktop environment may be opened based on an interaction with, for example, a link in the networked desktop workspace 402 to the other networked desktop environment. In another example, the networked desktop environment 400 may be included in another networked desktop environment and the other networked desktop environment may be opened based on an interaction with, for example, a control, such as a file system control. In some implementations, opening the other networked desktop environment may include exiting or closing the networked desktop environment 400.

In some implementations, the networked desktop environment 400 may be executed at multiple interface devices, such as the interface device 410 and another interface device 440, which may be a computing device, such as the computing device 100 shown in FIG. 1 or the computing and communication devices 100A/100B shown in FIG. 2. In some implementations, the interface device 410 may be a first type of interface device, and the other interface device 440 may be a second type of interface device. For example, the interface device 410 may be a laptop computer, and the interface device 440 may be a smartphone.

In some implementations, executing the networked desktop environment 400 at multiple interface devices 410/440 may be independent. For example, execution of the networked desktop environment 400 at the first interface device 410 may not depend on resources of the second interface device 440 and many not depend on execution of the networked desktop environment 400 at the second interface device 440. Similarly, execution of the networked desktop environment 400 at the second interface device 440 may not depend on resources of the first interface device 410 or execution of the networked desktop environment 400 at the first interface device 410.

In some implementations, executing the networked desktop environment 400 independently at multiple interface devices 410/440 may be interrelated. For example, interactions with the networked desktop environment 400 at the first interface device 410 may be communicated to the second interface device 440. Similarly, interactions with the networked desktop environment 400 at the second interface device 440 may be communicated to the first interface device 410.

In some implementations, executing the networked desktop environment 400 may include synchronizing the networked desktop environment 400 among multiple interface devices, such as the interface device 410 and the other interface device 440. In some implementations, synchronization may be performed in real time, or near real time. For example, the networked desktop environment 400 may be accessed concurrently at multiple interface devices and interactions with the networked desktop environment 400 received at one interface device may be synchronized with the other.

In some implementations, executing the networked desktop environment 400 may include performing conflict resolution. For example, the networked desktop environment 400 may be accessed concurrently at multiple interfaces devices 410/440, information indicating an interaction with the networked desktop environment 400 may be received from a first interface device 410, and information indicating another interaction with the networked desktop environment 400 may be received from a second interface device 440. The interaction information may indicate that the interactions occurred in close temporal proximity, the interactions may be conflicting interactions, and the networked desktop environment 400 may resolve the conflict. In some implementations, networked desktop environment 400 may resolve a conflict using a combination of last change wins and operational transformation heuristics.

In some implementations, executing the networked desktop environment 400 may include authenticating access rights. For example, executing the networked desktop environment 400 may include determining whether the interface device is authorized to access the networked desktop environment 400. In some implementations, the networked desktop environment 400 may be associated with an account, such as a user account, and authenticating access rights may include determining whether an account, such as a user account, associated with the interface device, which may be an active or logged in account, is authorized to access the networked desktop environment 400. For example, a user may create the networked desktop environment 400 as a private networked desktop environment and other users may not be authorized to access the private networked desktop environment.

In some implementations, executing the networked desktop environment 400 may include sharing the networked desktop environment 400. In some implementations, a networked desktop environment 400 may be shared with defined users, or groups of users. For example, a user may create the networked desktop environment 400 and may share the networked desktop environment 400 with one or more users or groups of users. In some implementations, a networked desktop environment 400 may be shared within a domain and users associated with the domain may be authorized to access the networked desktop environment 400. In some implementations, a networked desktop environment 400 may be shared with the public. In some implementations, a defined user or group of users may be prevented from accessing the networked desktop environment 400. For example, the networked desktop environment 400 may be shared with the public and a defined user may be denied access to the networked desktop environment 400.

In some implementations, sharing the networked desktop environment 400 may include indicating privileges associated with sharing the networked desktop environment 400. Privileges may include viewing, editing, or deleting the networked desktop environment 400. For example, the networked desktop environment 400 may be shared such that the public can view the networked desktop environment 400 and a defined user, or a defined group of users, can edit or delete the networked desktop environment 400.

For example, a human resources administrator of a company may create a networked desktop environment and may organize information in the networked desktop environment by task, such as new hire, promotions, expense reporting, and termination. The human resources administrator may share the networked desktop environment with a company domain as read only, and users associated with the company domain may access and view information in the networked desktop environment.

In some implementations, executing the networked desktop environment 400 may include collaboration, such as asynchronous collaboration, or synchronous collaboration.

In some implementations, collaborating on a networked desktop environment may be asynchronous. For example, a user at a first interface device may add an information element to a networked desktop environment at a first time. A second user at a second user interface device may access the networked desktop environment at a second time and may move the information element in the networked desktop workspace. The first user may access the networked desktop environment at a third time and may see the changed position of the information element.

In some implementations, collaborating on a networked desktop environment may be synchronous. For example, a first user at a first interface device and a second user at a second interface device may concurrently access a networked desktop environment. Interactions with the networked desktop environment received from the first user at the first interface device may be communicated to the second user at the second interface device and interactions with the networked desktop environment received from the second user at the second interface device may be communicated to the first user at the first interface device.

In an example, a member of family may create a networked desktop environment 400 and may share the networked desktop environment 400 with other members of the family. The networked desktop environment 400 may be accessed in the family kitchen via an interface device that includes a table-sized surface display that acts as a main workspace access point. Information elements, such as calendars, to-do lists, shopping lists, and children's homework may be left on the networked desktop workspace. These information elements may be private to the workspace, or may be included in other workspaces or standalone applications. When the parents are out shopping, they may check the networked desktop workspace from their mobile devices, for example, to access to their shopping lists. If someone back home discovers that a kitchen ingredient is needed, they may add it to the shopping list on the kitchen counter interface device and the new item may automatically be synced to the mobile devices. While the parents are out, they can monitor their children's progress on their homework by checking the state of the homework information elements in the networked desktop environment 400. If a child needs to leave a note for their parents, that note may be available directly on the mobile devices and when the parents get home and check the kitchen counter interface device.

In another example, a first user may create a networked desktop environment 400 called 'Vacation Planning' and may share the networked desktop environment 400 with another user. The first user may access the networked desktop environment 400 via a first interface device. The first user may open a browser window in the networked desktop workspace and may navigate to a vacation web site. The first user may create a spreadsheet document called 'Vacation Budget' in the networked desktop environment 400, and may position an icon representing the spreadsheet application on the networked desktop workspace. The first user may create a word processing document called 'Vacation Itinerary' in the networked desktop environment 400 and may position an icon representing the itinerary in the networked desktop workspace near the budget. The first user may highlight a portion of the open web page and may exit the networked desktop environment 400. The first user may send a link to the networked desktop environment 400 to the second user. The second user may access the networked desktop environment 400 and may see the budget icon, the itinerary icon, and the open web site with the highlighted portion.

Other implementations of the diagram of executing a networked desktop environment as shown in FIG. 4 are available. In implementations, additional elements of executing a networked desktop environment can be added, certain elements can be combined, and/or certain elements can be removed.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIGS. 1-3.

Further, for simplicity of explanation, although the figures and descriptions herein may include sequences or series of steps or stages, elements of the methods disclosed herein can occur in various orders or concurrently. Additionally, elements of the methods disclosed herein may occur with other elements not explicitly presented and described herein. Furthermore, not all elements of the methods described herein may be required to implement a method in accordance with the disclosed subject matter.

The implementations of the computing and communication devices (and the algorithms, methods, or any part or parts thereof, stored thereon or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the computing and communication devices do not necessarily have to be implemented in the same manner.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
   identifying, by a processor at a server in response to instructions stored on a non-transitory storage medium, a networked desktop state of a networked desktop environment, wherein the networked desktop environment includes a networked desktop workspace and an information element, and wherein the networked desktop state includes information indicating a multi-dimensional position of a representation of the information element in the networked desktop workspace;
   determining first rendering capabilities of a first interface device available for collaboratively sharing the networked desktop environment, the first rendering capabilities reflecting a rendering mode to use for rendering the networked desktop environment at the first interface device;
   determining second rendering capabilities of a second interface device available for collaboratively sharing the networked desktop environment, the second rendering capabilities reflecting a rendering mode to use for rendering the networked desktop environment at the second interface device, wherein the first rendering capabilities and the second rendering capabilities are different;

collaboratively sharing the networked desktop environment, wherein collaboratively sharing the networked desktop environment includes:
generating, at the server, instructions for use in rendering a graphical representation of the networked desktop workspace, wherein the instructions for use in rendering the graphical representation of the networked desktop workspace include information indicative of the networked desktop state, first rendering instructions based on the first rendering capabilities, and second rendering instructions based on the second rendering capabilities;
transmitting the instructions for use in rendering the graphical representation of the networked desktop workspace to the first interface device via a first network communication link, such that the graphical representation of the networked desktop workspace is renderable by the first interface device using the first rendering instructions;
transmitting the instructions for use in rendering the graphical representation of the networked desktop workspace to the second interface device via second a network communication link, such that the graphical representation of the networked desktop workspace is renderable by the second interface device using the second rendering instructions; and
receiving, via a network communication link, information indicating an interaction with the networked desktop environment at one or both of the first interface device or the second interface device, wherein the interaction includes a change of the multi-dimensional position; and
storing, at the server, the networked desktop environment, wherein storing the networked desktop environment includes updating the networked desktop state based on the change of the multi-dimensional position.

2. The method of claim 1, wherein the first interface device is of a first interface device type and the second interface device is of a second interface device type.

3. The method of claim 1, wherein receiving the information indicating the interaction includes receiving first information from the first interface device and receiving second information from the second interface device.

4. The method of claim 1, wherein the information element indicates a file, a folder, a widget, a tile, an applet, a window, a control, a pointer, or another networked desktop environment.

5. The method of claim 1, further comprising:
receiving a request for access to the networked desktop environment from a third interface device; and
transmitting instructions for use in rendering the graphical representation of the networked desktop workspace to the third interface device on a condition that a user associated with the request for access is authorized to access the networked desktop environment.

6. The method of claim 1, further comprising:
synchronizing the networked desktop environment with the first interface device and the second interface device.

7. The method of claim 1, further comprising creating the networked desktop environment, wherein creating the networked desktop environment includes:
receiving a request to create the networked desktop environment; and
generating the networked desktop state.

8. The method of claim 1, wherein the information element indicates a second networked desktop environment.

9. The method of claim 8, further comprising:
receiving, via a network communication link, information indicating a second interaction with the networked desktop environment, wherein the second interaction includes a selection of the second networked desktop environment;
in response to receiving the information indicating the second interaction:
identifying, by the processor at the server in response to the instructions stored on the non-transitory storage medium, a second networked desktop state of the second networked desktop environment, wherein the second networked desktop environment includes a second networked desktop workspace;
collaboratively sharing the second networked desktop environment, wherein collaboratively sharing the second networked desktop environment includes:
generating, at the server, instructions for use in rendering a graphical representation of the second networked desktop workspace, wherein the instructions for use in rendering the graphical representation of the second networked desktop workspace include information indicative of the second networked desktop state;
transmitting the instructions for use in rendering the graphical representation of the second networked desktop workspace to the first interface device, such that the graphical representation of the second networked desktop workspace is renderable by the first interface device based on the instructions for use in rendering the graphical representation of the second networked desktop workspace;
transmitting the instructions for use in rendering the graphical representation of the second networked desktop workspace to the second interface device, such that the graphical representation of the second networked desktop workspace is renderable by the second interface device based on the instructions for use in rendering the graphical representation of the second networked desktop workspace; and
receiving, via a network communication link, information indicating an interaction with the second networked desktop environment at one or both of the first interface device or the second interface device; and
storing, at the server, the second networked desktop environment, wherein storing the second networked desktop environment includes updating the second networked desktop state based on the information indicating an interaction with the second networked desktop environment.

10. An apparatus for use in automated collaboration, the apparatus comprising:
a memory; and
a processor configured to execute instructions stored in the memory to:
identify a state of a networked desktop environment, wherein the networked desktop environment includes a networked desktop workspace and an information element, and wherein the state includes information indicating a multi-dimensional position of a representation of the information element in the networked desktop workspace;
determine first rendering capabilities of a first interface device available for collaboratively sharing the networked desktop environment, the first rendering capabilities reflecting a rendering mode to use for rendering the networked desktop environment at the first interface device;

determine second rendering capabilities of a second interface device available for collaboratively sharing the networked desktop environment, the second rendering capabilities reflecting a rendering mode to use for rendering the networked desktop environment at the second interface device, wherein the first rendering capabilities and the second rendering capabilities are different;

collaboratively share the networked desktop environment, wherein collaboratively sharing the networked desktop environment includes:

generating instructions for use in rendering a graphical representation of the networked desktop workspace, wherein the instructions for use in rendering the graphical representation of the networked desktop workspace include information indicative of the state, first rendering instructions based on the first rendering capabilities, and second rendering instructions based on the second rendering capabilities;

transmitting the instructions for use in rendering the graphical representation of the networked desktop workspace to the first interface device, such that the graphical representation of the networked desktop workspace is renderable by the first interface device using the first rendering instructions;

transmitting the instructions for use in rendering the graphical representation of the networked desktop workspace to a second interface device, such that the graphical representation of the networked desktop workspace is renderable by the second interface device using the second rendering instructions; and receiving, via a network communication link, information indicating an interaction with the networked desktop environment at one or both of the first interface device or the second interface device, wherein the interaction includes a change of the multi-dimensional position; and storing the networked desktop environment, wherein storing the networked desktop environment includes updating the state based on the change of the multi-dimensional position.

11. The apparatus of claim 10, wherein the first interface device is of a first interface device type and the second interface device is of a second interface device type.

12. The apparatus of claim 10, wherein the processor is configured to execute instructions stored in the memory to receive the information indicating the interaction by receiving first information from the first interface device and by receiving second information from the second interface device.

13. The apparatus of claim 10, wherein the information element indicates a file, a folder, a widget, a tile, an applet, a window, a control, a pointer, or another networked desktop environment.

14. The apparatus of claim 10, wherein the processor is configured to execute instructions stored in the memory to:

receive a request for access to the networked desktop environment from a third interface device; and transmit instructions for use in rendering the graphical representation of the networked desktop workspace to the third interface device on a condition that a user associated with the request for access is authorized to access the networked desktop environment.

15. The apparatus of claim 10, wherein the processor is configured to execute instructions stored in the memory to:

synchronize the networked desktop environment with the first interface device and the second interface device.

16. The apparatus of claim 10, wherein the processor is configured to execute instructions stored in the memory to create the networked desktop environment by:

receiving a request to create the networked desktop environment; and generating the state.

17. The apparatus of claim 10, wherein the information element indicates a second networked desktop environment.

* * * * *